United States Patent [19]

Uetake et al.

[11] Patent Number: 5,761,263
[45] Date of Patent: Jun. 2, 1998

[54] NUCLEAR FUEL ROD AND METHOD OF MANUFACTURING THE SAME

[75] Inventors: Naohito Uetake, Hitachinaka; Masayoshi Kondoh; Katsumi Ohsumi, both of Hitachi; Akira Maru, Naka-gun; Yamato Asakura, Hitachinaka, all of Japan

[73] Assignee: Hitachi, Ltd., Tokyo, Japan

[21] Appl. No.: 581,200

[22] Filed: Dec. 29, 1995

[51] Int. Cl.$^6$ ............................................. G21C 3/00
[52] U.S. Cl. ............................................. 376/417; 376/457
[58] Field of Search ................................. 376/414–418, 376/454, 457

[56] References Cited

U.S. PATENT DOCUMENTS

| | | | |
|---|---|---|---|
| 3,580,171 | 5/1971 | Maes | 102/202.11 X |
| 3,793,920 | 2/1974 | Sheran | 102/205.5 X |
| 3,831,523 | 8/1974 | Thomas et al. | 102/202.11 |
| 3,964,255 | 6/1976 | Catanzarite | 60/205 |
| 3,969,186 | 7/1976 | Thompson et al. | 376/418 |
| 4,029,545 | 6/1977 | Gordon et al. | 376/417 |
| 4,045,288 | 8/1977 | Armijo | 376/417 |
| 4,208,967 | 6/1980 | Betts | 102/202.14 |
| 4,821,646 | 4/1989 | True et al. | 102/202.9 X |
| 5,247,550 | 9/1993 | Perkins et al. | 376/416 |
| 5,341,407 | 8/1994 | Rosenbaum et al. | 376/416 X |
| 5,383,228 | 1/1995 | Armijo et al. | 376/416 X |
| 5,434,897 | 7/1995 | Davies | 376/416 |
| 5,436,947 | 7/1995 | Taylor | 376/416 |
| 5,469,481 | 11/1995 | Adamson et al. | 376/416 |
| 5,517,540 | 5/1996 | Marlowe et al. | 376/416 X |
| 5,517,541 | 5/1996 | Rosenbaum et al. | 376/417 |
| 5,519,748 | 5/1996 | Adamson et al. | 376/547 |
| 5,524,032 | 6/1996 | Adamson et al. | 376/414 X |

FOREIGN PATENT DOCUMENTS

| | | |
|---|---|---|
| 140677 | 8/1983 | Japan |
| 179286 | 7/1988 | Japan |
| 18993 | 1/1989 | Japan |
| 206795 | 8/1990 | Japan |
| 120392 | 10/1992 | Japan |
| 138298 | 12/1992 | Japan |

*Primary Examiner*—Charles T. Jordan
*Assistant Examiner*—Matthew J. Lattig
*Attorney, Agent, or Firm*—Antonelli, Terry, Stout, & Kraus, LLP

[57] ABSTRACT

In a nuclear fuel rod having a zirconium liner and a method of manufacturing the same, the outer surface of a zircaloy cladding tube in which fuel pellets are filled has an oxide film having fine irregularities of which the pitch is 1 μm or less. The fine irregularities are formed by oxidizing the surface in high temperature steam or polishing the surface of the cladding tube. The surface of the fuel rod can effectively trap radioactive substances in the reactor water.

13 Claims, 3 Drawing Sheets

NUCLEAR FUEL ROD AND METHOD OF MANUFACTURING THE SAME

BACKGROUND OF THE INVENTION

This invention is related to a nuclear fuel rod, and more particularly to a nuclear fuel rod suitable for use in a boiling water reactor plant (hereinafter referred to as a BWR).

A zirconium liner is provided on the inner surface of a cladding tube of a nuclear fuel rod for the purpose of preserving the fuel rod from damage by physical and chemical interaction (PCI) between fuel pellets and the cladding tube of zircaloy for the BWR. In this case, an autoclave oxidation treatment of the fuel rod is omitted so as to prevent the zirconium liner from oxidization. Corrosion resistance of the cladding tube is greatly improved by modification of the alloy composition and improvement of the heat treatment of the zircaloy.

On the other hand, the zirconium liner tends to be deteriorated by fission products (FP) in the fuel pellets or hydrogen. Techniques for making an oxide film on the inner surface of the zirconium liner for the purpose of preventing deterioration is described in Japanese Patent Laid-open publication No. 1-18993 and Japanese Patent Laid-open publication No. 63-179286, and so on. These conventional techniques emphasize the improvement of the corrosion resistance of the internal surface of the cladding tube.

Radioactive nuclides in reactor water firmly deposit on the external surface of the cladding tube in contact with reactor water. In the conventional techniques, the reduction of the radioactivity of reactor water due to adhesion of radioactive nuclides has not been considered. In the case of existing chemical materials such as strong oxidants or solids with a high hardness in reactor water, there is a problem that the external surface of the cladding tube is easily damaged by them if the surface is made of metal.

SUMMARY OF THE INVENTION

An object of this invention is to provide a nuclear fuel rod and a method of manufacturing the same, thereby to prevent the fuel rod having a zirconium liner (hereinafter referred to as a zirconium liner fuel rod) from deterioration due to impurities contained in the reactor water by improving the adhesion of radioactive nuclides in the reactor water to the outer surface of the cladding tube.

The object of the present invention is achieved by forming irregularities of which pitch is 1 μ m or less on an outer surface of the cladding tube of a zirconium liner fuel rod. In this specification, the pitch is defined as the distance between adjacent peaks of irregularities.

Adhesion of radioactive metal ions or radioactive crud to the nuclear fuel rod of a BWR occurs as a result of a boiling phenomenon on the surface of the nuclear fuel rod, and the phenomenon of adhesion is different from the one that occurs in the a place where boiling occurs in the tubings, etc. The adhesion rate by boiling is evaluated by the following formula with the use of the deposition the rate coefficient K.

$$dW/dt = KQC/L \quad (1)$$

where dW/dt is the adhesion speed, Qa a heat flow, C is the density and L is the latent heat of vaporization.

Impurities such as metal ions and crud originating corrosion products are contained in reactor water, and a part of the impurities is activated by neutron irradiation in the reactor. Particularly, it is a problem that $^{58}Co$ and $^{60}Co$ have relatively long half lives and strong radioactivities. A part of these radioactive ions adhere to the outer surface of the nuclear fuel rod in boiling. The radioactive ions which have adhered to the fuel rod react with Fe crud which has adhered to the fuel rod in boiling, and the resulting products adhere to the fuel rod as stable ferro-oxides having a with small solubility. Thus, if the radioactive nuclides are removed from reactor water, the radioactivity of the reactor water is reduced.

The above mentioned method is based on a premise that the adhesion efficiency of Fe crud and metal ions (including radioactive ions) to the fuel rod is high. As for a zirconium liner fuel rod (hereinafter referred to as a BJ), an autoclave oxidation treatment is omitted. It was proved that the deposition rate coefficient of crud and metal ions on a cladding tube which has not been subjected to the autoclave oxidation treatment was low. Because of an improvement of the anti-corrosion property of a cladding tube, surface roughening due to, nodular corrosion of the cladding tube, etc., for example, is hard to take place and the deposition rate coefficient decreases. Therefore, the adhesion efficiency of radioactive nuclides to the fuel rod becomes low, and there is a possibility of high radioactivity in reactor water.

As the boiling of reactor water takes place in the surface of the fuel rod of the BWR, now easy the bubble generation during boiling depends on the property of the surface. Generally, it is said that a structure from to originate or cause foams can easily generate bubbles. While there is no established theory as to what structure causes a foaming point (the place where bubbles of steam generate), it is presumed that flaws and pores on the surface become foam points. If foaming is easy and the amount of bubbles is large, the slower the growth rate of bubbles is, the larger will be the deposition rate coefficient. Therefore, by forming fine irregularities on the surface of the cladding tube, the deposition characteristics of radioactive nuclides may be improved.

The size of a foaming point needs to be as small as that of the initial bubbles. In the case of the fuel rod of a BWR, the minimum diameter of the bubbles that release from the surface of a cladding tube is about 30 μm but the diameter of the initial bubbles is remarkably smaller than that. That is, it is about 1 μ m or less. Therefore, the pitch of the fine irregularities on the surface of the cladding tube needs to be smaller than that of an initial bubble.

It is necessary to stably hold deposited metal ions and crud in order to fix radioactive nuclides on the surface of the cladding tube. The effective methods for promoting the above mentioned properties are as follows.

(1) To increase the bonding strength between deposited particles and the surface of the cladding tube (2) To enlarge the contact surface between deposited particles and the surface of the cladding tube It is necessary to change the chemical property of the surface of the cladding tube to use the above mentioned method (1). Table 1 shows measurement results of the deposition rate coefficient of Co ions in case of changing oxides on the outer surface of the cladding tube.

TABLE 1

Relation between oxides on the surface of the cladding tube and deposition rate coefficients

| Oxide on outer surface | Deposition rate coefficient (relative value) |
| --- | --- |
| Without oxidizing after acid cleaning | 1 |
| Monoclinic zirconia: | |
| oxiding in steam of 400° C. for 12 Hr | 10 |
| Hexagonal zirconia: | |
| oxiding in steam of 500° C. for 1 Hr | 1.4 |

According to Table 1, it is apparent that the deposition rate coefficient is the highest in case of a monoclinic structure of the outer surface. As for a method of forming an oxide film, a stable oxide film in the reactor water is produced by oxidizing the outer surface in a higher temperature steam than that of the reactor water (about 285° C.).

Increasing the number of contact points with deposited particles by forming fine irregularities on the outer surface of the cladding tube is an effective way to use the above mentioned method (2). This is the countermeasure common to the problem of foaming point.

The diameter of deposited particles is considered to be several $\mu$m of crud (Fe crud) and to be 30 nm of Co oxide from Co ions (metal oxide from metal ions). Therefore, the pitch of the irregularities needs to be smaller than 1 m and desirably is smaller than 100 nm.

Further, from the point of view of increasing the number of contact points, the depth of the irregularities should be comparable to the diameter of deposited particles or more.

Table 2 shows measurement results of the deposition rate coefficients of Co ions in case of changing the pitch of polishing flaws (irregularities) by machine polishing.

TABLE 2

Relation between pitch of polishing flaws and deposition rate coefficient

| Pitch of polishing flaws | Deposition rate coefficient (relative value) |
| --- | --- |
| Without polishing after acid cleaning | 1 |
| 30 $\mu$m | 1 |
| Several $\mu$m | 1.2 |
| 300 nm | 5 |

A tendency of increase of the deposition rate coefficient to increase is recognized from Table 2, even if the pitch of the polishing flaws are only several $\mu$m. When the pitch of the polishing flaws are several 300 nm, an increase of the deposition rate coefficient is clearly recognized. But, it is difficult to control the pitch of the irregularities such as to 100 nm or less only by machine polishing. Accordingly, it is effective for adhesion improvement to combine the machine polishing and improving chemical properties by oxidation, and to form the fine irregularities on the oxide film surface.

Table 3 shows measurement results of the deposition rate coefficients related to autoclaving processing after machine polishing (described as buff polishing) and acid cleaning for eliminating polishing flaws after machine polishing.

TABLE 3

Relation between autoclaving pretreatment and deposition rate coefficient

| Autoclaving pretreatment | Deposition rate coefficient (relative value) |
| --- | --- |
| Acid cleaning | 1 |
| Buff polishing | 2 |

From Table 3, it is apparent that the better deposition characteristics could be obtained by an autoclaving processing after machine polishing.

As mentioned above, the deposition characteristics of the radioactive nuclides of zirconium liner fuel rods can be improved by forming fine irregularities, of which the pitch is 1 $\mu$m or less on the outer surface with monoclinic zirconium oxide.

There exist in reactor water chemical species such as radicals generated by decomposition of the reactor water due -to radiation and chromic acid that has strong oxidizing property. These chemical species may cause the zircaloy cladding tube to be deteriorated by direct action, or when hard solid materials are mixed in the reactor water, the solid materials are collide with the fuel rods.

When an oxide film exists on the outer surface of the fuel rod, the existence of the oxide film is useful to prevent the problems because the chemical species do not act directly on the metal surface.

Anyway, if a structure having fine irregularities of which the pitch is 1 ||m or less, exists on the outer surface of the cladding tube, the deposition characteristics are improved and the deposited crud is effectively fixed on the outer surface.

The relation between the grinding precision (corresponding to the pitch of irregularities) of the outer surface of the cladding tube and the measured value of the deposition rate coefficients is shown in FIG. 4. From FIG. 4, it is apparent that the deposition rate coefficients become remarkably larger when the grinding precision becomes 0.1 $\mu$m or less.

It has been known that in oxidizing zircaloy, when the thickness of the oxide film becomes about 0.5 $\mu$m (30 mg/dm$^2$) or more, fine cracks (irregularities) occur on the oxide film surface and a transition phenomenon occurs where a dependency of oxidation on time changes from $^1\!/_3$ to t$^{1/1}$ power rule. Our test result shows that, when an oxide film of 1 $\mu$m or more thickness is formed, fine cracks of about 40 pieces/$\mu$m$^2$ occur due to the above mentioned phenomenon. These cracks also contribute to an improvement of the deposition rate coefficient. The cracks occur when the crystalline structure of the zirconia in the oxide film shifts from cubic lattice to monocline, thereby to produce gaps caused by volume reduction and anisotropy generation (that is, elongation in one direction and shrinkage in another direction). At the present, as the additive elements in zircaloy are distributed homogeneously, highly dense cracks can be produced by selecting proper oxidizing conditions. In this case, it is possible to judge whether cracks occurs or not by observing the presence of monoclinic zirconia on the outer surface.

DETAILED DESCRIPTION OF PREFERRED EMBODIMENTS

Figure 1A:
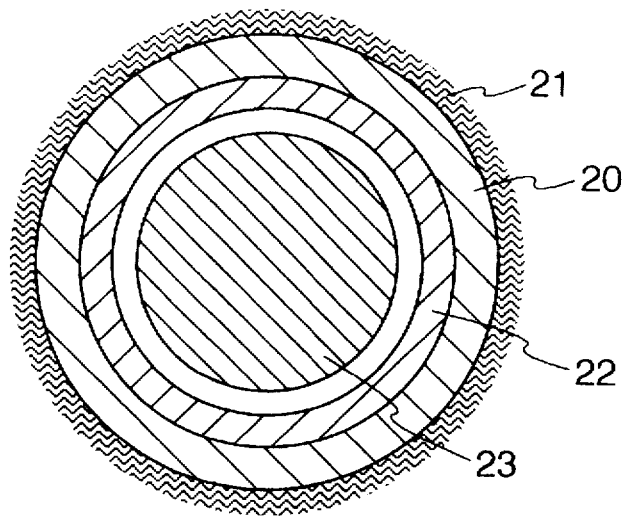
FIG. 1(a) is a cross-section of an embodiment of a zirconium liner fuel rod to which this invention is applied and FIG. 1(b) is a side view thereof.

An embodiment of this invention will be explained with reference to FIG. 1(a) as follows. FIG. 1(a) shows the first embodiment of a zirconium liner fuel rod to which this invention is applied.

Figure 1B:

The outer surface of the zircaloy cladding tube 20 is covered with a film of monoclinic zirconium oxide 21, and as seen in FIG. 1(b), the film 21 has polishing flaws (grooves) 24, of which the pitch is 100–500 nm, extending in the circumferential direction of the fuel rod. Zirconium liner 22 is provided inside of the cladding tube 20 and the liner 22 is filled with fuel pellets 23.

A method of manufacturing the fuel rod will be explained with reference to using FIG. 2. After fitting the zircaloy-2 billet and the pure zirconium billet at the thickness ratio of 89 to 10, both ends of the billets are welded by an electron beam to make a dual pipe. The dual pipe is subjected to adhering by hot extrusion at 600° C. to make a raw pipe. Then, after heating the raw pipe to 930° C. by high frequency induction heating, it is cooled at the rate of 200° C./second. Next, rolling and annealing at about 600° C. for 2 hours are repeated 3 times alternately to make a cladding tube (Zr-Liner tube) having an outer diameter of about 12 mm and a thickness of about 1 mm. Then, after the surface of the cladding tube is ground by buff polishing to form the polishing flaws (irregularities), of which the pitch is 100s nm, extending in the circumferential direction, the cladding tube is cleaned with acid, or pure water and an organic solvent (acid cleaning). Next, after sealing both ends of the cladding tube by welding end plugs therein an oxide film on the outer surface of the cladding tube is formed through an autoclaving process for 12 hours in a steam of 400° C., 2 atm. Then, the end plug is cut off from the cladding tube, fuel pellets and rare gas are charged in the cladding tube, and the end plug is welded to make a fuel rod. A fuel assembly is prepared by assembling about 80 fuel rods thus produced, at least one water rod, spacers, etc.

In a zircaloy cladding tube, the pitch of the irregularities can be maintained in the autoclaving process after the polishing process. Therefore, a fuel rod produced by the method shown in FIG. 2 can improve the deposition characteristics of radioactive species to the outer surface of the cladding tube.

Figure 3:
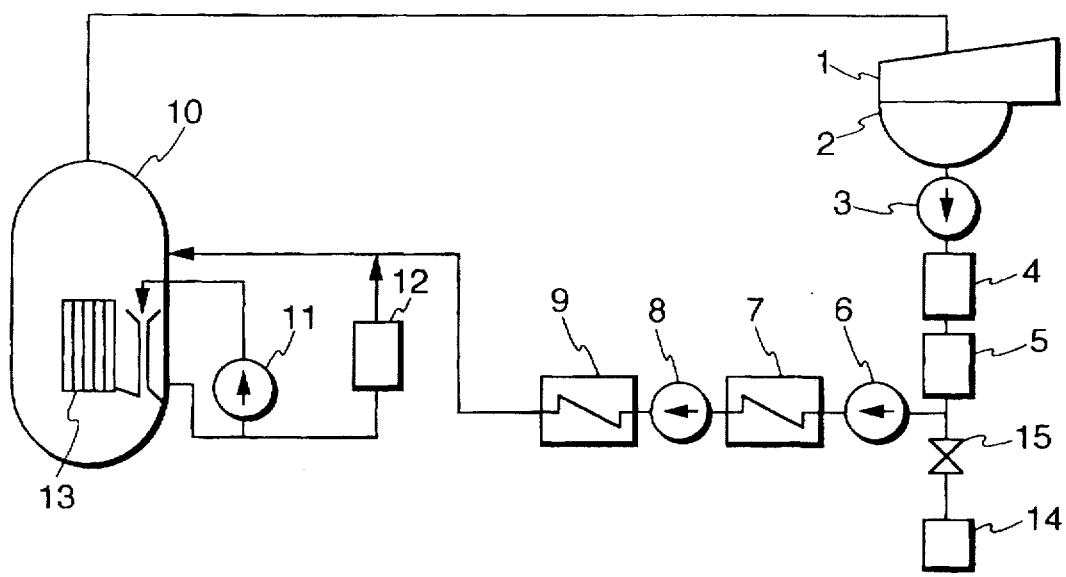
FIG. 3 is a schematic diagram of a BWR plant to which fuel rods shown in FIG. 1(a) are loaded.
Figure 4:
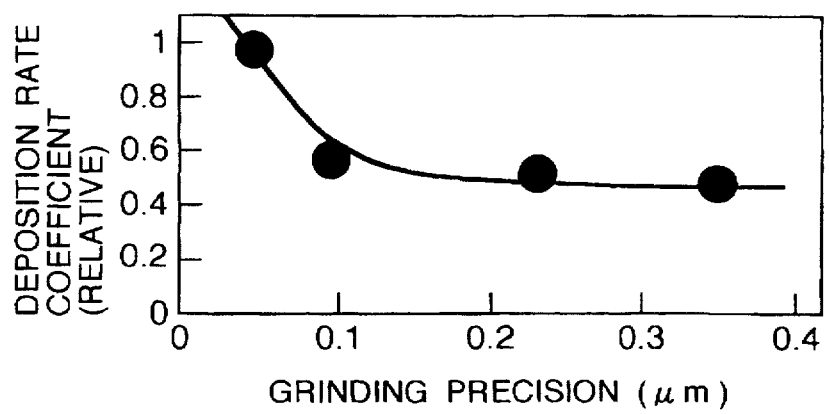
FIG. 4 is a graph of the relation between the grinding precision of the outer surface of a cladding tube and corresponding deposition rate coefficients.

FIG. 3 shows the constitution of a BWR plant to which the fuel rods are loaded. The steam discharged from turbine 1 is turned into water in condenser 2, and the condensate discharged from condenser 2 is pumped through condensate filter 4 by condensate pump 3 so that impurities in the condensate are removed by condensate demineralizer 5. The purified water is led to reactor pressure vessel 10 via feedwater pump 6, low-pressure feedwater heater 7, booster pump 8 and high-pressure feedwater heater 9.

Thus, the reactor water contains Fe crud as a corrosion product and metal ions such as Ni ion, Co ion, etc. that are mainly produced in the low-pressure feed water heater 7, the high-pressure feed water heater 9 and the reactor pressure vessel 10. While a part of them are removed at reactor demineralizer 12 connected to a pipe branched from the upper stream of reactor recirculation pump 11, the removal rate is small. Therefore, almost all of them exist in the reactor water and on the surface of the fuel rods.

Fuel rods 13 having a zirconium liner are loaded into the reactor pressure vessel 10 before operation. The output of the reactor increases and the surface of the fuel rod begins boiling when the operation begins. Thereafter, Fe crud is produced by operating an Fe injection device 14 for electrolytic iron, and the Fe crud is injected into the feed water through an injection valve 15. The amount of Fe crud injected is controlled to be about 1 ppb (Fe concentration) in the feed water. The Fe crud and the radioactive ions deposit efficiently on the fuel rod, and then they react to form ferrite and are stably fixed on the surface of the fuel rod. As a result, a direct interaction between the fuel rod and an oxidative materials or solid materials in reactor water can be prevented.

Therefore, in the BWR plant in an operation after loading the zirconium liner fuel rods in this embodiment, it is possible to suppress any increase of radioactivity and to prevent the deterioration of the cladding tubes due to impurities in the reactor water.

Figure 2:
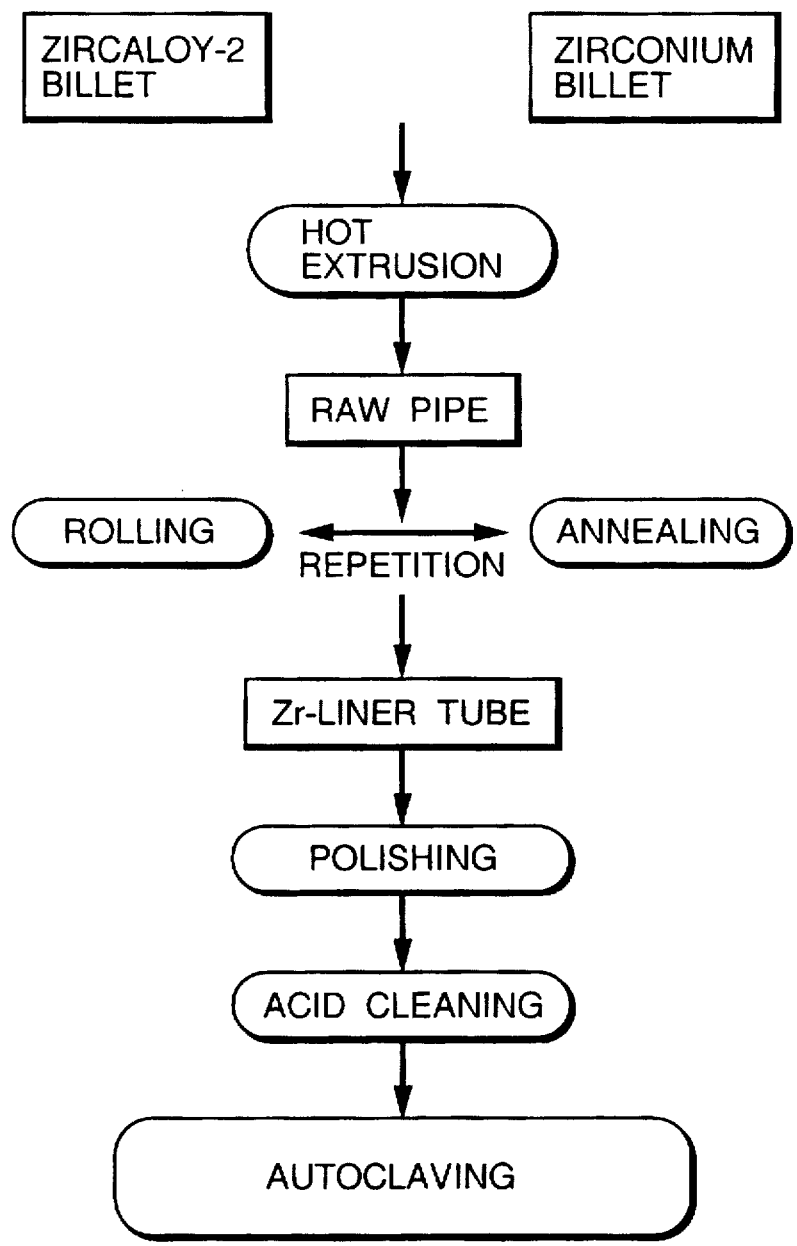
FIG. 2 is a flow diagram of an embodiment of a manufacturing process of the fuel rod shown in FIG. 1(a).

While the embodiment of FIG. 2 shows an example of a process where the fuel assembly is asembled after the autoclaving process, the autoclaving process may be adopted after assembling the fuel assembly. In this case, the cutting of the end plug after the welding of the end plugs can be omitted, and also oxidation of the spacers etc. can be carried out simultaneously.

A coating of a corrosion resistant material can be applied to the inner surface of the zirconium liner, or alloying elements for improving corrosion resistance can be added to the zirconium. In this case, an autoclaving process can be performed without fitting the end plugs so that the process can be further simplified.

Another manufacturing method for a fuel rod will be explained with reference to FIG. 1(a). After fitting the zircaloy-2 billet and the pure zirconium billet, both ends of the billets are welded by an electron beam to make a dual pipe. The dual pipe is subjected to adhering by hot extrusion at 600 ° C. to make a raw pipe. Then, after heating the raw pipe to 930° C. by high frequency induction heating, it is cooled at the rate of 200 ° C./second. Next, rolling and annealing at about 600° C. for 2 hours are repeated 3 times alternately to make a cladding tube having an outer diameter of about 12 mm and a thickness of about 1 mm. The cladding tube is subjected to polishing, cleaning and autoclaving. Thereafter, the cladding tube is subjected to oxidizing in an atmosphere of high-temperature steam or in an atmosphere containing oxygen for forming an oxide film of 0.5 μm thickness or more. Next, the oxide film on the inner surface of the cladding tube is removed by grinding. Then, fuel pellets and rare gas are charged in the cladding tube and end plugs are welded at both ends to make a fuel rod. A fuel assembly is prepared by assembling about 80 fuel rods thus produced, at least one water rod, spacers, etc. The fuel rod and the fuel assembly manufactured by this process can achieve the same advantages as in the previous embodiment.

We claim:

1. A nuclear fuel rod comprising:
   fuel pellets;
   a cylindrical zirconium liner in which the fuel pellets are confined; and
   a zircaloy cladding tube covering the liner, the zircaloy cladding tube having an outer surface said outer surface having grooves in at least a part of the outer surface, said grooves having a pitch of 1am or less.

2. The nuclear fuel rod according to claim 1, wherein the pitch is 0.1 µm or less.

3. The nuclear fuel rod according to claim 1, wherein the cladding tube has a layer of monoclinic zirconium oxide on the outer surface.

4. The nuclear fuel rod according to claim 1, wherein the pitch of the grooves is 100–500 nm.

5. A zircaloy cladding tube for a nuclear fuel rod comprising:

an outer surface having grooves in at least a part of the outer surface, a pitch of said grooves being 1 µm or less.

6. The zircaloy cladding tube according to claim 5, wherein the pitch is 0.1 µm or less.

7. The zircaloy cladding tube according to claim 6, wherein the outer surface of the zircaloy cladding tube having irregularities is provided by a layer of monoclinic zirconium oxide having a thickness of 1 µm or more.

8. A nuclear fuel rod comprising:

fuel pellets;

a cylindrical zirconium liner in which the fuel pellets are confined; and a zircaloy cladding tube covering the liner, the zircaloy cladding tube having an outer surface furthest from the liner, said outer surface having surface irregularities, the surface irregularities being surface unevenness in at least a part of the outer surface, said surface unevenness having a pitch of 1 µm or less, said surface unevenness being polishing flaws in the outer surface.

9. A nuclear fuel rod comprising:

fuel pellets;

a cylindrical zirconium liner in which the fuel pellets are confined; and a zircaloy cladding tube covering the liner, the zircaloy cladding tube having an outer surface furthest from the liner, said outer surface having surface irregularities, the surface irregularities being surface unevenness in at least a part of the outer surface, said surface unevenness having a pitch of 1 µm or less, said surface unevenness being produced by machine polishing, and wherein the outer surface has been subjected to an autoclaving process after the machine polishing.

10. A zircaloy cladding tube for a nuclear fuel rod comprising:

an outer surface, to be furthest from nuclear fuel, having surface irregularities, the surface irregularities being a surface unevenness in at least a part of the outer surface, a pitch of said surface unevenness being 1 µm or less, said surface unevenness being polishing flaws in the outer surface.

11. A nuclear fuel rod comprising:

fuel pellets;

a cylindrical zirconium liner in which the fuel pellets are confined; and a zircaloy cladding tube covering the liner, the zircaloy cladding tube having an outer surface furthest from the liner, said outer surface having surface irregularities in at least a part of the outer surface, said surface irregularities having a pitch of 1 µm or less, the cladding tube having a layer of monoclinic zirconium oxide on the outer surface.

12. The nuclear fuel rod according to claim 11, wherein the layer of monoclinic zirconium oxide provides said irregularities having a pitch of 1 µm or less-line.

13. A zircaloy cladding tube for a nuclear fuel rod comprising:

an outer surface, to be furthest from nuclear fuel, having irregularities in at least part of the outer surface, a pitch of said irregularities being 0.1 µm or less, wherein the outer surface of the zircaloy cladding tube having irregularities is provided by a layer of monoclinic zirconium oxide having a thickness of 1 µm or more.

* * * * *